US012495927B1

(12) United States Patent
Bjorum (10) Patent No.: US 12,495,927 B1
(45) Date of Patent: Dec. 16, 2025

(54) PORTABLE VERTICAL ROTISSERIE

(71) Applicant: Justin Bjorum, Wyoming, MI (US)

(72) Inventor: Justin Bjorum, Wyoming, MI (US)

( * ) Notice: Subject to any disclaimer, the term of this patent is extended or adjusted under 35 U.S.C. 154(b) by 376 days.

(21) Appl. No.: 17/892,574

(22) Filed: Aug. 22, 2022

Related U.S. Application Data (60) Provisional application No. 63/235,198, filed on Aug. 20, 2021.

(51) Int. Cl.
*A47J 37/04* (2006.01)
*A47J 33/00* (2006.01)

(52) U.S. Cl.
CPC .................................. *A47J 37/043* (2013.01)

(58) Field of Classification Search
CPC ........ A47J 37/043; A47J 33/00; A47J 37/047; A47J 37/0623; A47J 37/0629; A47J 37/0664; A47J 37/041; A47J 37/1295; A47J 43/18; A47J 36/22
USPC .......... 99/421 R, 443 R, 339, 403, 419, 426, 99/421 H, 421 V, 446, 447
See application file for complete search history.

(56) References Cited

U.S. PATENT DOCUMENTS

| | | | | |
|---|---|---|---|---|
| 2,517,360 A | * | 8/1950 | Singer ................... | A47J 37/043 99/341 |
| 3,503,323 A | * | 3/1970 | Swetlitz ................ | F24C 15/164 99/450 |
| 3,598,611 A | * | 8/1971 | Swetlitz ................ | F24C 15/14 426/523 |
| 3,604,341 A | * | 9/1971 | Coroneos ............... | A47J 37/043 99/421 V |
| 3,956,979 A | * | 5/1976 | Coroneos ............... | A47J 37/043 99/421 V |
| 4,300,443 A | * | 11/1981 | Morcos ................. | A47J 37/043 99/332 |
| 5,586,490 A | * | 12/1996 | Saman .................. | A47J 37/043 99/421 H |
| 5,761,991 A | * | 6/1998 | Kambies ............... | A47J 37/049 99/427 |

(Continued)

FOREIGN PATENT DOCUMENTS

| | | | | |
|---|---|---|---|---|
| DE | 19740659 A1 | * | 3/1999 | ............ A47J 37/043 |
| DE | 10249094 A1 | * | 4/2004 | ............ A47J 37/043 |

(Continued)

*Primary Examiner* — Eric S Stapleton
(74) *Attorney, Agent, or Firm* — Gardner, Linn, Burkhart & Ondersma LLP (57) ABSTRACT

A portable rotisserie device is provided for spinning a food item (e.g. meat, vegetables, etc.) and uniformly exposing the sides of the food to a remote heat source. The rotisserie includes a heat resistant base assembly that is positionable alongside or inside various types of remote heat sources, including campfires, wood-fired ovens, and the like. A rotatable platform is supported at the base and a motor rotates the platform relative to the base. A food support, in the form of a catch pan and spit or skewer, is supported by the platform such that the food support spins about an upright axis to uniformly expose the food to the heat source. The food support is readily removable from the platform to remove the food without moving the entire rotisserie. Optionally, the skewer is readily removable from the catch pan and the entire rotisserie is disassemblable for space efficient storage and transport.

16 Claims, 5 Drawing Sheets

(56) References Cited

U.S. PATENT DOCUMENTS

| | | | | |
|---|---|---|---|---|
| 6,363,836 | B1 * | 4/2002 | Usherovich | A47J 37/043 99/421 V |
| 11,602,242 | B2 * | 3/2023 | Lange | A47J 37/0745 |
| 2002/0023547 | A1 * | 2/2002 | Backus | A47J 37/042 99/427 |
| 2003/0005828 | A1 * | 1/2003 | McLemore | A47J 37/1295 99/426 |
| 2017/0055767 | A1 * | 3/2017 | Brown | A47J 37/041 |
| 2018/0184841 | A1 * | 7/2018 | Bruin-Slot | A47J 37/043 |

FOREIGN PATENT DOCUMENTS

| | | | | |
|---|---|---|---|---|
| DE | 102020117100 | A1 * | 12/2021 | A47J 37/043 |
| DE | 102016007671 | B4 * | 12/2022 | A47J 37/043 |

* cited by examiner

PORTABLE VERTICAL ROTISSERIE

CROSS REFERENCE TO RELATED APPLICATION

The present application claims priority of U.S. provisional application Ser. No. 63/235,198, filed Aug. 20, 2021, which is hereby incorporated by reference herein in its entirety.

FIELD OF THE INVENTION

The present invention is directed to rotisserie cooking devices.

BACKGROUND OF THE INVENTION

Rotisseries, spit-roasters, or rotisserie style cooking devices and systems are designed to rotate or spin food items, such as meats, to uniformly expose the sides of the food item to a nearby heat source. Rotisseries are typically fixed or stationarily mounted to a structure proximate the heat source and the heat source is typically mounted a fixed distance away from the rotisserie spit. Rotisseries may include a dedicated, integral heat source positioned nearby the food for cooking the food.

SUMMARY OF THE INVENTION

The present invention provides a portable rotisserie device for cooking food near a remote heat source such that the rotisserie is repositionable relative to the heat source. The rotisserie includes a spit or skewer for piercing and supporting a food item (e.g. kabob meat, whole chicken, etc.) in an upright position. The rotisserie includes a driver, such as an electric gear motor, to rotate the skewer about a vertical axis. The rotisserie can be readily disassembled, enabling a user to pack the device in a space-efficient manner for transport. For example, the rotisserie may have dimensions making it advantageous and desirable for campers or backpackers to transport in their packs. Because the rotisserie is portable and repositionable relative to the heat source, it may be positioned in proximity to many different types of remote heat sources, as desired by the user. For example, the device may be placed alongside a campfire such that heat from the campfire cooks the food item. The rotisserie rotates the food item to sequentially expose all of the sides of the food item to the heat from the fire. Additional features or components may be provided with the rotisserie, including repositionable heat shields, removable perimeter heat reflectors, temperature sensors or gauges, and different food support devices, such as catch pans, racks, tiered shelves, forks, or baskets, for example. The driver may be automatic or powered, such as the above mentioned electric gear motor, or manual, such as a manual wind-up mechanism for non-energized use of the rotisserie.

According to one form of the present invention, a portable rotisserie device is provided for rotating a food item to uniformly expose the sides of the food item to a remote heat source, such as a fireplace, a campfire, a gas stove, or the like. The rotisserie includes a heat resistant base assembly, a rotatable platform, a motor, and a removable food container or food support in the form of a catch pan and skewer assembly. The platform supports the food support above the base assembly and rotates the container about a generally upright or vertical axis. The motor is positioned at an interior of the base assembly and is operable to rotate the platform relative to the base. The motor may be a manually driven motor (e.g. a wind-up motor) or a power driven motor (e.g. an electric motor). Optionally, the rotisserie device may include a turntable bearing between the motor and the platform. The food support retains the food item such that as the platform rotates, each side surface of the food item will be sequentially exposed to the remote heat source. The food support is supported on the platform and is readily removable from the platform so that a user may remove the food item from the base and platform without moving the remainder of the rotisserie away from the heat source. Preferably, the structural components of the rotisserie are formed of aluminum or other metal having high heat conductivity characteristics.

In one aspect, the food support includes the catch pan and the skewer that is removably attached to the catch pan. The catch pan vertically supports the food item and contains drippings that fall from the food item as it cooks. The skewer includes a sharp or pointed distal/upper end to pierce the food item as is it placed on the skewer. The skewer retains the food item in an upright manner while the food item is cooked. The skewer includes an elongated body with a fixture tab extending laterally from a proximal/lower end of the skewer's body. The fixture tab is insertable into an elastic strap that is attached to the catch pan. The elastic strap biases the tab toward the catch pan to retain the skewer in an upright orientation relative the catch pan.

In another aspect, the platform includes a set of standoffs or support fingers spaced along an upper surface of the platform. The support fingers coordinate with one another to vertically support the food support above the upper surface of the platform. Preferably, the support fingers are formed of a heat resistant material having a high coefficient of friction (e.g. silicone rubber) such that the fingers frictionally support the food support in a lateral direction.

In still another aspect, an annular opening is formed in an upper surface of the base, and the platform is positioned below the upper surface of the base. The support fingers extend upwardly from the platform and through the annular opening to support the food support above the upper surface of the base.

Accordingly, the present invention provides a portable and packable rotisserie system for placement within or alongside a remote heat source. The rotisserie rotates a food item (e.g. kabob meat, whole chicken, etc.) about an upright or vertical axis, thereby rotating or spinning the food item and uniformly exposing all sides of the food item to the heat source. The portability of the rotisserie permits a user to reposition the rotisserie as desired, such as moving the food item nearer to the heat source as the heat source diminishes (e.g. as a campfire exhausts its fuel source). The rotisserie includes a food support, in the form of a catch pan and skewer, which is independent of and removable from the rotational drive system of the rotisserie.

These and other objects, advantages, purposes and features of this invention will become apparent upon review of the following specification in conjunction with the drawings.

DESCRIPTION OF THE PREFERRED EMBODIMENTS

Referring now to the drawings and the illustrative embodiments depicted therein, a portable rotisserie device or system 10 is provided for rotating a food item 12 (e.g. kabob meat, whole chicken, vegetables, etc.) to expose all sides of the food to a remote heat source, such as a fireplace (FIG. 1), a campfire, or a gas stove, for example. The rotisserie 10 may be positioned in proximity to many different remote heat sources suitable for food preparation, as chosen by the user. For example, the rotisserie 10 may be placed alongside a campfire such that heat from the campfire heats a food item 12 on the rotisserie 10. In this manner, the rotisserie 10 rotates the food item 12 to sequentially and uniformly expose all of the sides of the food item 12 to the heat from the fire. The rotisserie 10 includes a heat resistant base assembly 14, a rotatable platform 16, a driver such as an electric motor 18, and a removable food container or support 20 (FIGS. 1-5). The rotisserie 10 is readily disassembled, allowing a user to pack the rotisserie 10 in a space-efficient manner to transport the rotisserie 10. The food support 20 is readily removable from the platform 16, permitting a user to simply remove the food item 12 from the heat source, such as when the food item 12 has been sufficiently cooked. The rotisserie 10 rotates the food item about a generally vertical axis. The food support 20 includes a catch pan 22 to catch drippings from the food item 12 and a food spit, spike, or skewer 24 to pierce and retain the food item 12 in an upright position. Optionally, additional or fewer components or accessories may be provided for the food container to facilitate desired preparation of food items, such as inclusion of a basket or cage, multiple tines or skewers, or a tiered shelf, for example.

Figure 1:
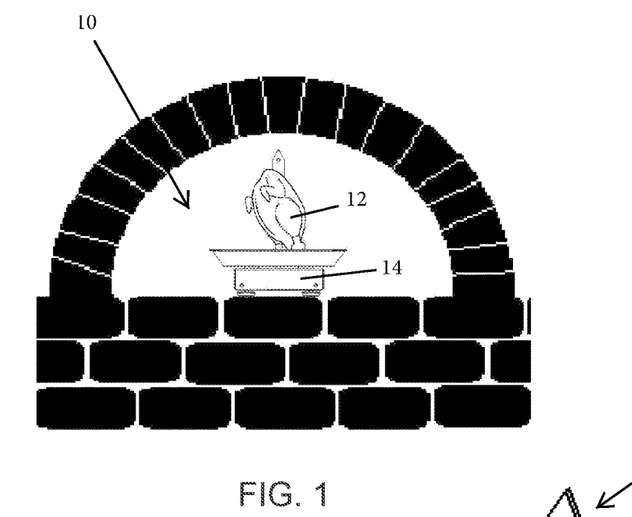
FIG. 1 is a front elevation view of a portable rotisserie device in accordance with the present invention, depicting the rotisserie device positioned near a remote heat source in a fireplace.
Figure 2:
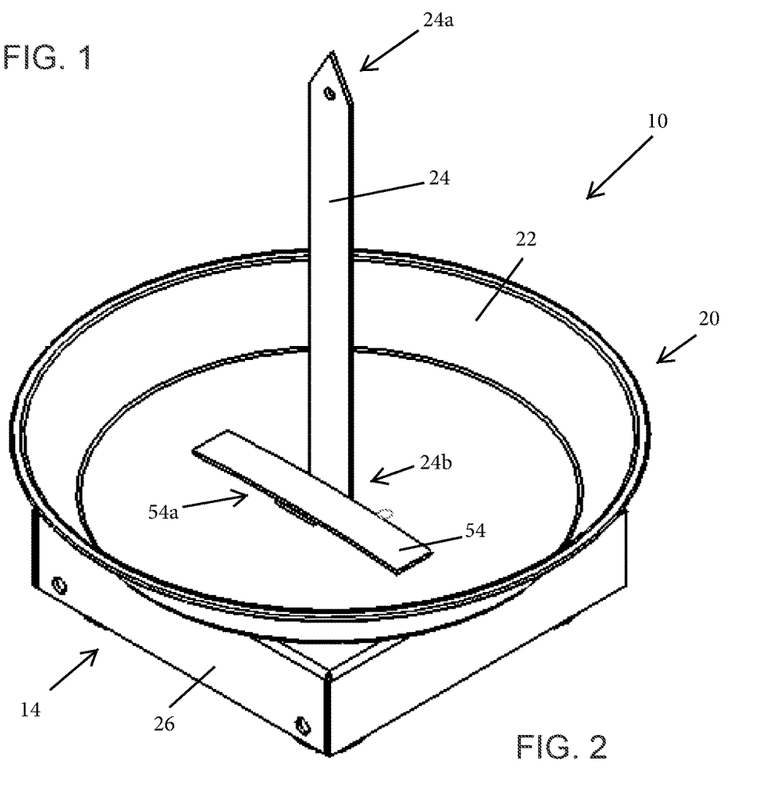
FIG. 2 is a side perspective view of the rotisserie device of FIG. 1.
Figure 3:
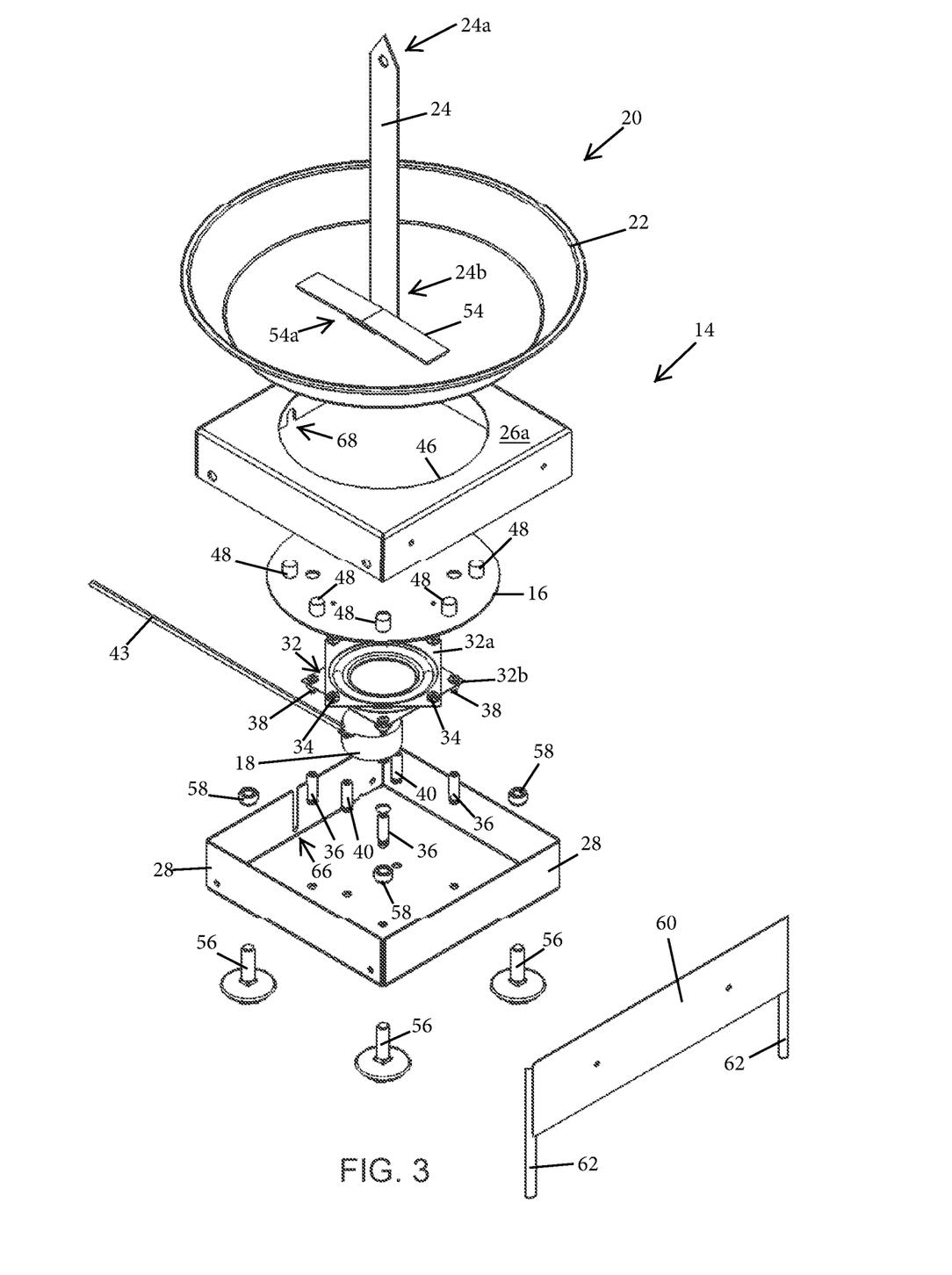
FIG. 3 is a partially exploded side perspective view of the rotisserie device of FIG. 1.
Figures 4, 5, 6:
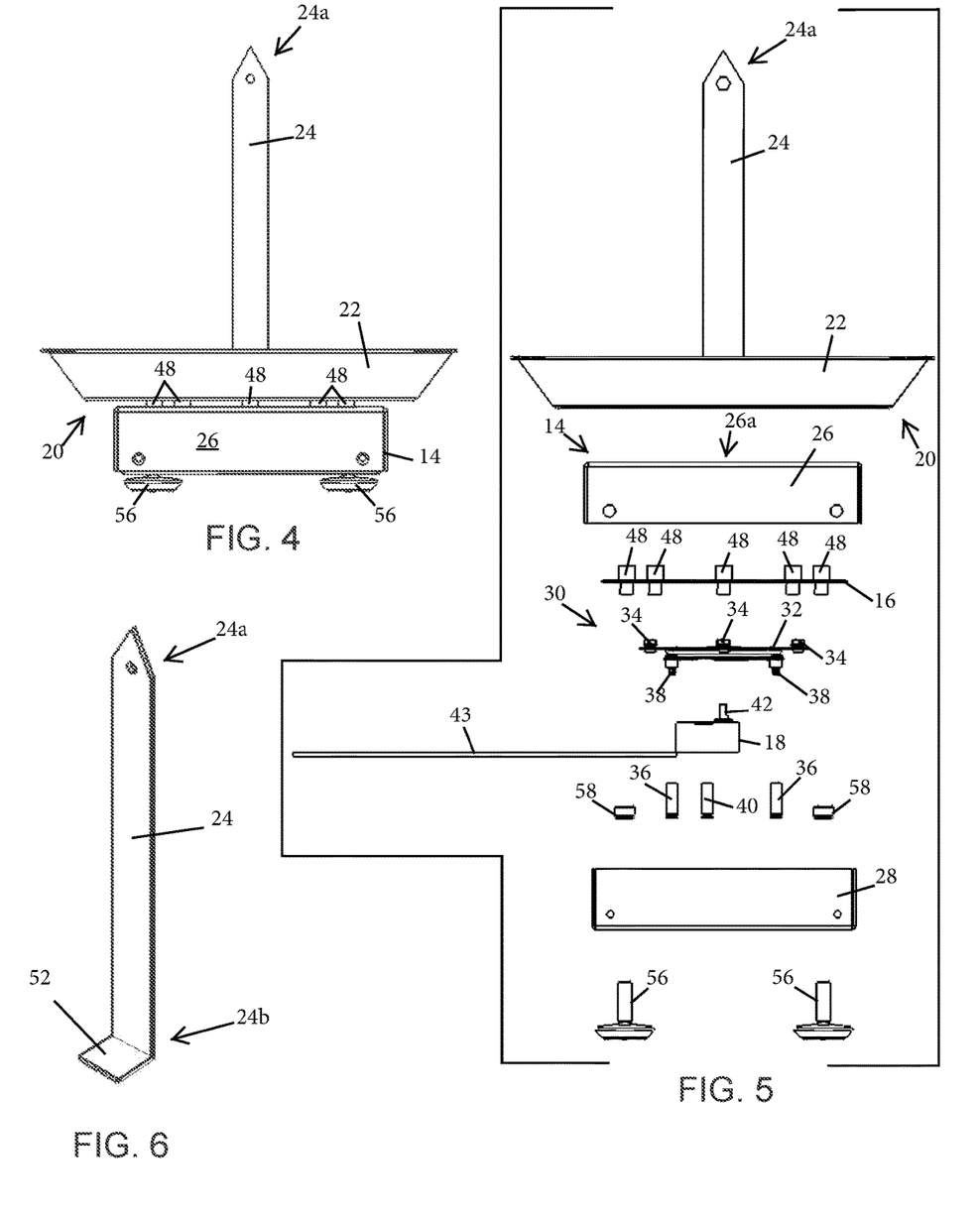
FIG. 4 is a front elevation view of the rotisserie device of FIG. 1.
FIG. 5 is a partially exploded front elevation view of the rotisserie device of FIG. 1.
FIG. 6 is a side perspective view of a skewer of the rotisserie device of FIG. 1.

The rotisserie 10 includes the base assembly 14 which houses various components including the motor 18 and a portion of the platform 16, as best illustrated in FIGS. 2 and 5. The base assembly 14 vertically supports platform 16 and thereby food support 20. The platform 16 is rotatable in a horizontal plane relative to the base 14. An upper cover 26 and a lower cover 28 cooperate with one another to define a heat resistant perimeter or shell of the base assembly 14 (FIGS. 2-5). A drive assembly 30, which includes the motor 18, drives rotation of the platform 16 and is positioned inside base assembly 14 (FIGS. 3 and 5). Drive assembly 30 includes a turntable bearing 32 providing a low-profile rotation support between the platform 16 and the motor 18. The platform 16 is a circular plate that is fastened to an upper portion 32a of the bearing 32 with mechanical fasteners, in the form of nuts and bolts 34 (FIGS. 3 and 5). A lower portion 32b of the bearing 32 is coupled to lower cover 28 with mechanical fasteners, in the form of bearing standoff sleeves 36 and bolts 38 (FIGS. 3 and 5). The motor 18 is coupled to lower cover 28 with mechanical fasteners including motor standoff sleeves 40. The motor 18, in the form of an electric rotary gear motor, includes a rotary output drive or shaft 42 (FIG. 5) that is fixedly coupled to the axial center of the platform 16 with a mechanical fastener such as a nut or other threaded fastener. The shaft 42, bearing 32, and platform 16 are co-axial with one another such that the platform 16 rotates substantially freely about its axial center. The shell of base assembly 14 protects and shields the motor 18 and bearing 32 from direct heat and from dirt and debris, such as ash and food drippings. Alternatively, a non-electric driver may be used in place of electric motor 18. For example, a manual wind-up mechanism using a clock spring or other energy storage device may be used in place of an electric motor. Such a manual driver would enable use of the rotisserie 10 in backpacking or camping applications where an electrical source is unavailable and/or electric batteries would be excessively heavy to carry.

An annular opening or hole 46 is formed in the upper surface 26a of the upper cover 26 (FIG. 3). A set of support fingers or standoffs 48 are spaced in an annular ring along platform 16 and protrude through opening 46 above the upper surface 26a to vertically support the food support 20 above the base assembly 14 (FIGS. 3-5). The fingers 48 are preferably formed of a heat resistant and high-friction material (e.g. rubber) such that the fingers 48 frictionally engage a lower surface of the food support 20 to provide some lateral support for the food support 20. In the illustrated embodiment, fingers 48 provide the sole interaction point between the food support 20 and platform 16 such that the food support 20 is not fixedly coupled to any portion of the platform 16 or base assembly 14. It will be appreciated that direct mechanical fasteners are not required for the food support 20 to rest atop the platform 16, such that the food support 20 is held in place and rotated only by a combination of gravity and the frictional interaction between fingers 48 and the bottom surface of food support 20. In other words, the food support 20 is only supported vertically to counteract gravity force, and it resists sliding off the platform 16 in the lateral direction due to friction introduced as a function of the weight of the food and food support 20 resting on the fingers 48 (i.e. friction between the support 20 and fingers provides a weak lateral support or force to counteract or prevent sliding of the food support). Thus, food support 20 is independent of and freely removable from the platform 16. The food support 20 may be removed simply by lifting or moving the food support 20 upwardly and/or laterally away from the platform 16. As such, the food support can be quickly removed from the base assembly 14 and packed or stored in a compact fashion without releasing any fasteners or securing devices.

It is contemplated that the food support 20 may be partially or weakly secured to the platform 16 without the use of a direct mechanical fastener, coupling, or coupler, while still permitting the support 20 to be removable from the platform 16 simply by lifting or moving the food support 20 upwardly and/or laterally away from the platform 16. For example, a pair of weak magnets may be disposed on respective ones of the catch pan 22 and the platform 16 to magnetically couple the two components together, wherein a relatively weak upward or lateral force applied to the food support 20 may break the weak magnetic attraction force. As another example, dimples may be formed in a lower or base portion of the catch pan 22 with the dimples correspondingly positioned to partially receive respective ones of the fingers 48 to provide some level of lateral support between the food support 20 and platform 16 in addition to the frictional support described above.

The food support 20 includes the catch pan 22 and food skewer 24 to retain the food item 12 such that as the platform 16 rotates, the exposed sides of the food item 12 are uniformly exposed to the remote heat source. The skewer 24 may be coupled to the catch pan 22 for cooking (FIGS. 2-5) or decoupled from the catch pan 22 for packing and transport. The skewer 24 includes an elongate body that extends perpendicularly from the base of the catch pan 22 when the skewer is installed with the catch pan. The skewer 24 pierces the food item 12 as the food item is placed onto the skewer and thereby retains the food item in an upright position relative to the catch pan 22. The distal end 24a of the skewer 24 is pointed to easily pierce the food item 12. A fixture tab or anchor 52 extends perpendicularly from the proximal end 24b of the skewer 24 and is provided for securing the skewer 24 to the catch pan 22 (FIG. 6). A strap 54 is fixed at each end to the base of the catch pan 22 and a center portion 54a of the strap 54 is substantially unattached or free from catch pan 22 (FIGS. 2 and 3). Without the skewer 24 installed, the center portion 54a rests apart from the base of catch pan 22 by about equal to or slightly less than the thickness of tab 52. As best illustrated in FIGS. 2 and 3, the tab 52 is insertable beneath the center portion 54a of the strap 54 such that strap 54 biases the tab 52 toward the base of catch pan 22 to securely grip tab 52 and retain the skewer 24 in an upright position. It will be appreciated that the strap 54 may be provided in non-elastic form or fashion and still provide similar support for the skewer 24.

While the illustrated embodiment discloses the skewer coupled to the catch pan with a tab and strap configuration, it will be appreciated that other releasable or removable fastener types may be used to releasably couple the skewer and catch pan together. The catch pan 22 may be utilized for cooking additional food items, such as vegetables, and drippings collected in the catch pan 22 may comingle with the additional food items. The additional food items would likewise be cooked or heated by the heat source. Further, while the illustrated embodiment discloses the skewer coupled to the catch pan, it will be appreciated that the catch pan may be omitted and the skewer removably coupled with the platform without substantially affecting the cooking functionality and advantages of the rotisserie 10.

A set of adjustable feet 56 are attached to lower cover 28 with nuts 58 (FIGS. 3-5). Feet 56 support the rotisserie 10 against a surface, such as the ground surface or a base of a fire pit, for example. Feet 56 are adjustable in order to provide leveling adjustment for the rotisserie 10 to facilitate a generally level positioning for the rotisserie 10. In other words, the feet 56 are adjustable to facilitate leveling of the base assembly 14 to ensure that the skewer 24 is in a generally upright or vertical orientation and catch pan 22 is in a level orientation when the food support 20 is positioned on the platform 16.

Figure 7:
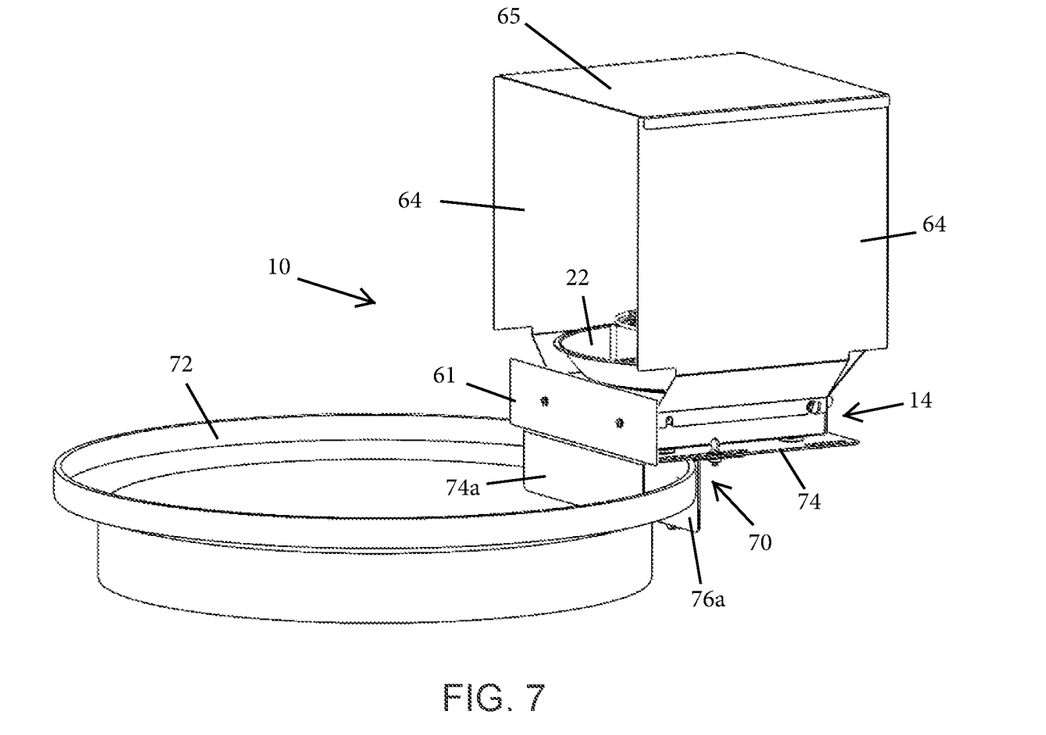
FIG. 7 is a side perspective view of the portable rotisserie device of FIG. 1 supported on a clamp-on platform, depicting the rotisserie device clamped onto a fire pit ring.
Figure 9:
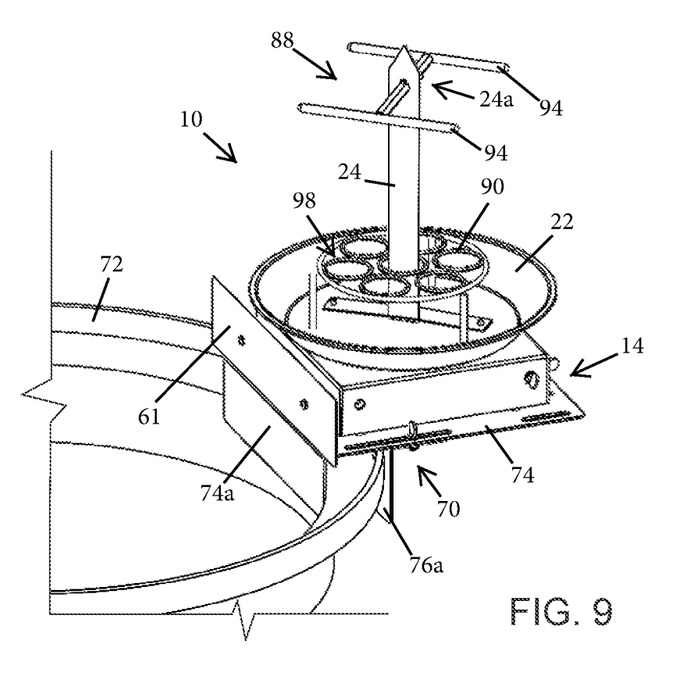
FIG. 9 is a side perspective view of the rotisserie device of FIG. 7 with a food support stand and a food hanger in accordance with the present invention, with side walls omitted to show underlying structure.

Optionally, one or more optional repositionable heat shields or deflectors 60 may be positioned alongside or in front of the rotisserie 10 to deflect or disperse heat from the remote heat source, such as shown in FIG. 3. The repositionable deflectors 60 are each defined by a rectangular body and include a ground stake 62 at each side end of the rectangular body. The stakes 62 are drivable into a ground surface proximate the rotisserie 10 to support the deflector 60 in a desired position adjacent the rotisserie 10. Repositionable deflectors 60 may protect the rotisserie 10 from damage from excessive heat while permitting the rotisserie 10 to be positioned sufficiently close to the remote heat source to adequately cook the food item 12. As illustrated in FIGS. 7 and 9, an optional, fixed heat deflector 61 may be coupled at a portion of the base assembly 14 to deflect heat away from the heat-source-facing side of the rotisserie 10.

As depicted in FIG. 7, optional removable perimeter heat reflectors 64 and a top heat reflector or cover 65 are provided with the rotisserie 10. Perimeter and top reflectors 64 and 65 may block airflow from rotisserie 10 to retain heat around the food item 12 and may also trap, reflect, or otherwise contain heat around the food item 12. Perimeter and top reflectors 64 and 65 may be removably coupled to rotisserie 10 with a quick release fastener system. For example, the quick release fastener system may include slots in the lower portion of the reflectors 64 which slideably mate with screws or tabs protruding from sides of the base assembly 14. Preferably, structural elements of the food support 20 (e.g. catch pan 22 and skewer 24) are formed of a metal having high heat conductivity characteristics, such as aluminum, for example. Also preferably, the structural elements of the rotisserie 10 are formed of lightweight, heat-resilient materials.

Optionally, a power cord 43 may be coupled to the motor 18 to energize the motor 18, as shown in FIGS. 3 and 5. The power cord 43 may be protected with a heat resistant material, such as an adhesive-lined heat resistant shrink wrap, for example. The power cord 43 is routed into the base assembly 14 through a cable channel 66 formed in the lower cover 28 (FIG. 3). The upper cover 26 includes a cable slot 68 that fits over the power cord 43 when the upper cover 26 is installed with the lower cover 28 (FIG. 3). The power cord 43 may include a control device, which may be configured to adjust the speed of the motor 18 and thereby adjust the speed of rotation of the platform 16.

Figure 8:
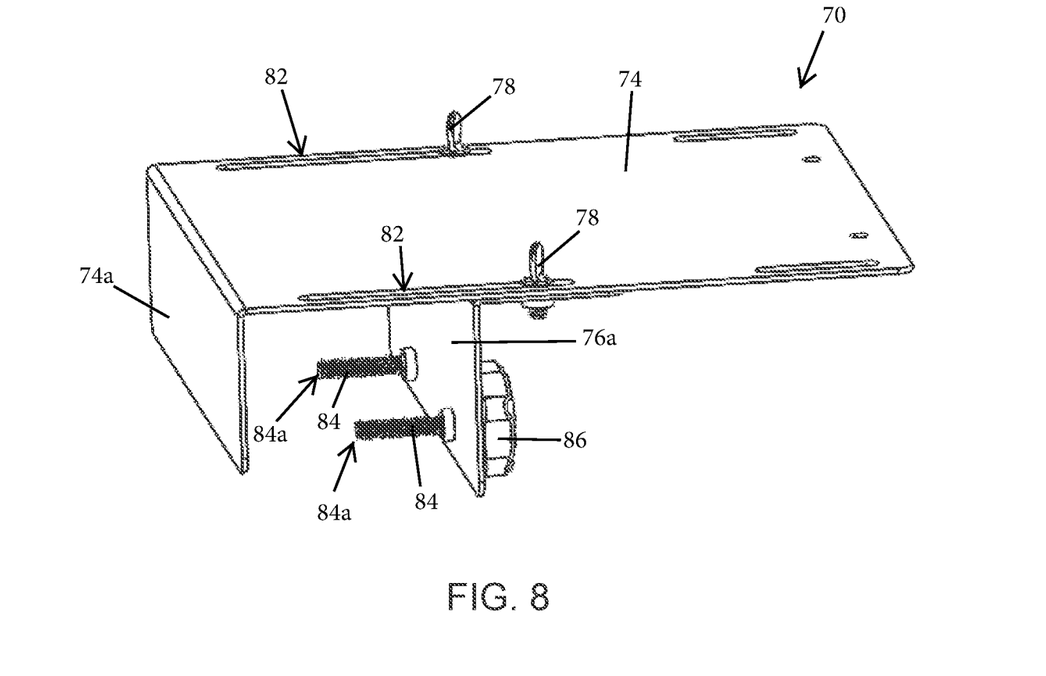
FIG. 8 is a side perspective view of the clamp-on platform of FIG. 7.

Referring now to the illustrative embodiment of FIGS. 7-9, a removable and repositionable clamp-on platform 70 is provided for supporting the rotisserie 10 at an upper edge or rim of a fire pit ring 72, next to a remote heat source inside the ring 72. The platform 70 includes an upper L-shaped bracket 74 for supporting the rotisserie 10 and engaging an interior side and upper edge of the ring 72. A lower L-shaped shaped bracket 76 is slidably and repositionably coupled to a lower side of the upper bracket 74 and provided for engaging an exterior side of the ring 72. A pair of mechanical fasteners, in the form of threaded fasteners 78 with grips or tabs 80, are provided for coupling the lower bracket 76 to the upper bracket 74 (FIG. 8). The fasteners 78 are received through slots 82 formed in the upper bracket 74. The fasteners 78 are threaded into receivers, such as nuts, provided at or below the lower surface of the lower bracket 76. The fasteners 78, when tightened into the receivers at the lower bracket 76, engage an upper surface of the upper bracket 74 and provide a clamping force to clamp the upper bracket 74 to the lower bracket 76. It will be appreciated that the fasteners 78 may be left in a loose or under-tightened state enabling the lower bracket 76 to move somewhat freely relative to the upper bracket 74.

A pair of mechanical fasteners, in the form of thumbscrews including threaded fasteners 84 with handles 86, are provided at a forward portion 76a of the lower bracket 76 for removably securing the platform 70 to the ring 72. As the fasteners 84 are tightened the distal ends 84a contact the exterior of the ring 72 and act to urge the platform 70 away from the center of the ring 72 and thereby pull a forward portion 74a of the upper L-shaped bracket 74 toward the interior wall of the ring 72. As such, the fasteners 84 and forward portion 74a of bracket 74 cooperate to provide a clamping force to secure the platform 70 to the upper rim of the ring 72.

Figure 10:
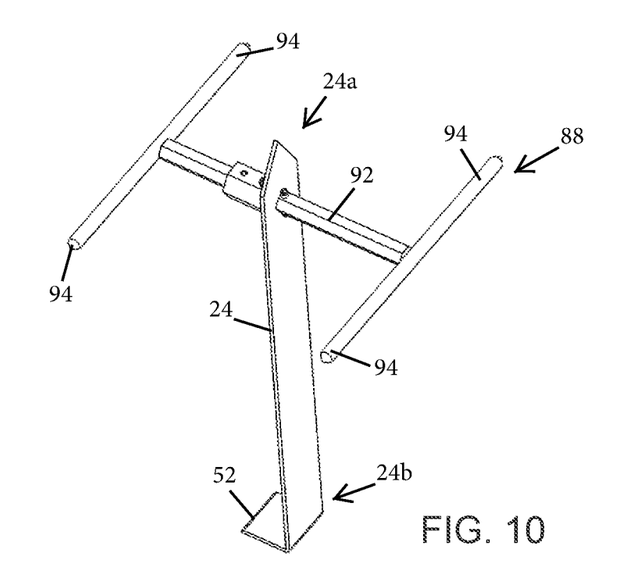
FIG. 10 is a top perspective view of the skewer and food hanger of FIG. 9.

As illustrated in FIGS. 9 and 10, accessory food supports are provided for supporting various foods, such as foods that are not easily pierced or impaled on the skewer 24 due to their size or fragility, e.g. sausages, eggs, etc. The accessory food supports include a hanger 88 and an elevated rack 90. The hanger 88 includes a central beam 92 and four arms 94 extending perpendicularly from respective distal ends of the beam 92. The arms 94 and beam 92 form an I-shaped support that is supported or mounted at its midsection to the skewer 24, such as through a hole formed through the distal end 24a of the skewer 24. The beam is formed in two sections and includes a coupler 96 for coupling the two sections together. In this manner, a first portion of the beam may be passed through or received in the hole at the distal end 24a of the skewer, and the second portion then coupled via the coupler 96 to the first portion. This arrangement enables a user to break down or dismantle the hanger 88 and skewer 24 for compact storage, such as for packing in a hiking pack. It will be appreciated that the beam 92 may be provided in a unitary configuration, without substantially affecting the function of the hanger 88. The rack 90 includes a plurality of support rings 98 positioned in a circular pattern alongside one another (FIG. 9). The rack 90 includes an open center permitting the rack to be positioned over the skewer 24 and then supported at the catch pan 22. The rings 98 may individually support a food item, such as a tomato, onion, egg, or the like, or larger food items may be laid over and supported by multiple rings 98. It will be appreciated that other forms of support may be provided at the upper portion of the rack 90, such as a mesh or a wire grate, for example.

Thus, the rotisserie device of the present invention provides a portable option for rotisserie style cooking utilizing a remote heat source, such as a campfire or wood-fired oven. The rotisserie may be disassembled and packed in a space efficient manner and may be deployed and positioned alongside or inside of a remote heat source, as desired by the user. The rotisserie includes a base assembly, a rotating platform, and a motor to rotate the platform. A catch pan and skewer support the food item directly and the catch pan and skewer are removably supported on the rotating platform. Heat deflectors may be positioned between the rotisserie and the heat source to protect particular components of the rotisserie and/or heat reflectors may be coupled to the rotisserie to redirect or retain heat around the food item. Alternative food containers may also be utilized and rotated with the rotisserie, including baskets, racks, hangers, and tiered shelves.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:
1. A portable rotisserie comprising:
a heat resistant base positionable proximate a remote heat source, an upper surface of said base comprising an annular opening;
a platform coupled with said base and rotatable in a horizontal plane relative to said base;
a plurality of support fingers in spaced arrangement along an upper surface of said platform;
a driver coupled with said base and operable to rotate said platform; and
a food support removably supported at said platform without a mechanical coupling and retained laterally by frictional contact between said food support and said platform, said food support configured to retain a food item proximate said platform such that as said platform rotates, sides of the food item will be sequentially exposed to the remote heat source;
wherein said support fingers are configured to vertically support said food support above said platform; and
wherein said platform is positioned below said upper surface of said base, and said support fingers extend upwardly from said platform through said annular opening such that said food support is supported on said support fingers above said upper surface of said base.

2. The rotisserie of claim 1, wherein said food support comprises a skewer removably coupled to a catch pan, said catch pan configured to contain drippings from the food item, and said skewer configured to pierce and retain the food item in an upright manner relative to said catch pan.

3. The rotisserie of claim 2, wherein said skewer comprises an elongated body and a fixture tab disposed at a proximal end of said body and extending laterally from said body, said fixture tab is insertable into a portion of said catch pan to retain said skewer relative said catch pan.

4. The rotisserie of claim 2, further comprising a food hanger coupled to a distal end of said skewer and configured to support food items in a hanging fashion above said catch pan.

5. The rotisserie of claim 1, further comprising a clamp coupled to said base and configured to selectively engage an upper edge of a fire ring.

6. The rotisserie of claim 1, wherein said driver comprises an electric motor.

7. The rotisserie of claim 1, further comprising a heat reflector coupled to said base and configured to be positioned opposite the remote heat source relative to the food support, said heat reflector configured to reflect heat toward the food item supported on said food support.

8. A portable rotisserie for rotating a food item proximate a remote heat source to cook the food item, said rotisserie comprising:
a support base;
a clamp coupled to said support base and configured to selectively engage an upper edge of a fire ring;
a catch pan for vertically supporting a food item;
a skewer removably coupled to said catch pan and extending from a bottom portion of said catch pan, said skewer configured to retain and support the food item in an upright manner;
a rotatable platform for supporting said catch pan such that said catch pan is only frictionally supported in the lateral direction by said rotatable platform;
a driver operable to rotate said platform and said catch pan to rotate the food item;
said support base housing said driver and a portion of said platform; and
a heat reflector coupled to said rotatable platform and configured to reflect heat toward the food item supported on said catch pan.

9. The rotisserie of claim 8, wherein said skewer comprises an elongated body and a fixture tab disposed at a proximal end of said body and extending perpendicular to said body, said fixture tab is insertable into a portion of said catch pan for removably coupling said skewer to said catch pan.

10. The rotisserie of claim 8, further comprising a turntable bearing disposed between said driver and said platform.

11. The rotisserie of claim 8, wherein said platform comprises a plurality of support fingers extending above an upper surface of said support base and configured to support said catch pan above said support base.

12. A portable rotisserie comprising:
a heat resistant base;
a platform rotatably supported at said base and configured to rotate a food item relative to said base;
a food support removably supported at said platform and laterally retained along said platform by frictional contact between said food support and said platform;
said food support comprising a skewer configured to pierce the food item to secure it to said food support;
a driver disposed inside of said base and operable to rotate said platform relative to said base such that the food item rotates relative to a remote heat source proximate said rotisserie in order to expose all sides of the food item to the heat source;
a heat reflector coupled to said base and configured to reflect heat toward the food item supported on said food support; and
a clamp coupled to said heat resistant base and configured to selectively engage an upper edge of a fire ring;
wherein said heat reflector is positioned laterally outboard of the fire ring when said clamp is engaged at the upper edge of the fire ring.

13. The rotisserie of claim 12, wherein said food support further comprises a catch pan supporting said skewer, said catch pan configured to contain drippings from the food item.

14. The rotisserie of claim 13, wherein said skewer is selectively removable from said catch pan and comprises an elongated body and a fixture tab disposed at a proximal end of said body and extending laterally from said body, said fixture tab is insertable into a portion of said catch pan for removably coupling said skewer to said catch pan.

15. The rotisserie of claim 13, wherein said platform comprises a plurality of support fingers in spaced arrangement along an upper surface of said platform, said support fingers configured to support said catch pan both vertically above said platform and laterally as a function of friction between said support fingers and said catch pan.

16. The rotisserie of claim 12, further comprising a turntable bearing disposed between said driver and said platform.

* * * * *